(12) United States Patent
Kamiyama et al.

(10) Patent No.: US 11,230,142 B2
(45) Date of Patent: Jan. 25, 2022

(54) VEHICLE WHEEL AND METHOD OF MANUFACTURING THE VEHICLE WHEEL

(71) Applicant: HONDA MOTOR CO., LTD., Tokyo (JP)

(72) Inventors: Youichi Kamiyama, Wako (JP); Yuta Shimamura, Wako (JP); Mikiharu Nakanishi, Wako (JP); Takuro Hama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 16/659,693

(22) Filed: Oct. 22, 2019

(65) Prior Publication Data

US 2020/0130409 A1    Apr. 30, 2020

(30) Foreign Application Priority Data

Oct. 26, 2018 (JP) .............................. JP2018-201547

(51) Int. Cl.
  *B60B 21/12*  (2006.01)
  *G10K 11/172*  (2006.01)
  *B60C 19/00*  (2006.01)
(52) U.S. Cl.
  CPC ............ *B60B 21/12* (2013.01); *B60C 19/002* (2013.01); *G10K 11/172* (2013.01); *B60B 2310/3025* (2013.01)

(58) Field of Classification Search
  CPC ..... B60B 21/12; B60B 21/026; G10K 11/172; B60C 19/002
  See application file for complete search history.

(56) References Cited

FOREIGN PATENT DOCUMENTS

| EP | 0677429 A1 | * | 10/1995 | ........... G10K 11/172 |
|----|------------|---|---------|------------------------|
| GB | 2509976 A  | * | 7/2014  | ............. B60B 21/12 |
| JP | 2009149234 A | * | 7/2009 | |
| JP | 5657309 B2 | | 1/2015 | |
| KR | 20170067951 A | * | 6/2017 | |
| WO | WO-2020054928 A1 | * | 3/2020 | ............. B60B 21/12 |

* cited by examiner

*Primary Examiner* — Kip T Kotter
(74) *Attorney, Agent, or Firm* — Rankin, Hill & Clark LLP (57) ABSTRACT

A vehicle wheel includes: a pair of rail members configured as separate members from the rim and fixed to an outer circumferential surface of a well portion of a rim of a wheel; and a sub air chamber member serving as a Helmholtz resonator and disposed between and supported by the rail members. A method of manufacturing the vehicle wheel is also provided. The method includes the steps of: fixing the pair of rail members to the outer circumferential surface of the well portion; and attaching the sub air chamber member to the well portion through the pair of rail members such that the sub air chamber member is supported between the pair of rail members, wherein the rail member fixing step includes fixing the pair of rail members using a jig with the rail members spaced apart by the predetermined distance.

4 Claims, 6 Drawing Sheets

VEHICLE WHEEL AND METHOD OF MANUFACTURING THE VEHICLE WHEEL

CROSS-REFERENCE TO RELATED APPLICATION

This application claims the benefit of foreign priority to Japanese Patent Application No. JP2018-201547, filed Oct. 26, 2018, which is incorporated by reference in its entirety.

TECHNICAL FIELD

The present invention relates to a vehicle wheel and a method of manufacturing the vehicle wheel.

BACKGROUND ART

A vehicle wheel with a Helmholtz resonator provided on an outer circumferential surface of a well portion of a rim has been known, for example, from Japanese Patent No. 5,657,309. The Helmholtz resonator of this vehicle wheel is held by a pair of well-portion rising walls that are disposed opposite to each other in a wheel width direction. To be more specific, a groove portion is formed in each of the opposing surfaces of the pair of well-portion rising walls to extend in a circumferential direction of the wheel. The Helmholtz resonator has edge portions at both ends in the wheel width direction, and these edge portions are fitted into and thus fixed to the groove portions of the well-portion rising walls.

According to this vehicle wheel, even if a large centrifugal force acts on the Helmholtz resonator while the wheel rotates at high speeds, the Helmholtz resonator can be held stably relative to the rim.

However, the conventional vehicle wheel (see for example JP5,657,309B) is manufactured by cutting the well-portion rising walls to provide the groove portions. Further, in the cutting process, settings of a cutting tool have to be changed every time one of the pair of groove portions is formed. For this reason, the groove portion forming process for the conventional vehicle wheel is time-consuming, which disadvantageously leads to an increase in the manufacturing cost of the wheel.

In view of the above, the present invention seeks to provide a vehicle wheel, which can reduce the manufacturing cost while stably holding a Helmholtz resonator relative to the rim, and a method of manufacturing the vehicle wheel.

SUMMARY

The present invention proposed to attain the above object provides a vehicle wheel comprising: a pair of rail members fixed to an outer circumferential surface of a well portion of a rim of a wheel, the pair of rail members being separate members from the rim; and a sub air chamber member serving as a Helmholtz resonator, the sub air chamber member being disposed between the rail members and supported by the rail members.

The present invention also provides a method of manufacturing the above-described vehicle wheel, the method comprising: a rail member fixing step of fixing to the outer circumferential surface of the well portion the pair of rail members that are separate members from the rim of the wheel such that the rail members are disposed parallel to and spaced apart from each other by a predetermined distance; and a sub air chamber member attaching step of attaching the sub air chamber member to the well portion through the pair of rail members such that the sub air chamber member is supported between the pair of rail members, wherein the rail member fixing step comprises a step of fixing the pair of rail members using a jig with the rail members spaced apart by the predetermined distance.

DETAILED DESCRIPTION OF THE INVENTION

A vehicle wheel according one embodiment of the present invention will be described below with reference to the drawings where appropriate. In the drawings to be referred to, "X" represents a circumferential direction of a wheel (i.e., wheel circumferential direction), "Y" represents a wheel width direction, and "Z" represents a radial direction of the wheel (i.e., wheel radial direction).

As a main feature, a vehicle wheel according to this embodiment includes a pair of rail members fixed to an outer circumferential surface of a well portion of a rim of a wheel, and a sub air chamber member (i.e., Helmholtz resonator), wherein the pair of rail members are separate members from the rim, and the sub air chamber member is attached to the outer circumferential surface of the well portion through the pair of rail members.

In the following description, the overall structure of the vehicle wheel will be described, and thereafter rail members and a sub air chamber member will be described in detail.

Overall Structure of Vehicle Wheel

Figure 1:
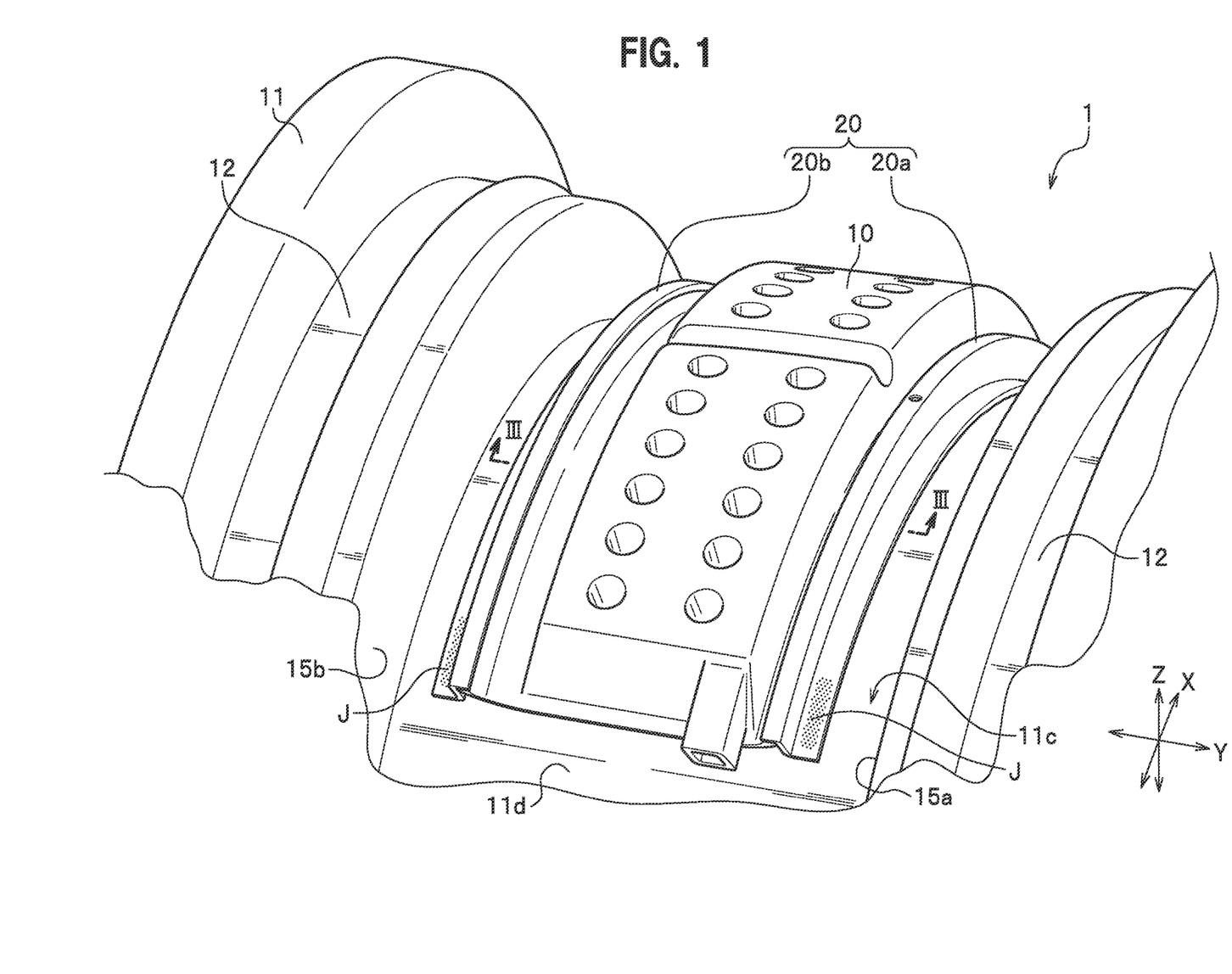
FIG. 1 is an enlarged perspective view partly showing a vehicle wheel according to one embodiment of the present invention.

FIG. 1 is an enlarged perspective view partly showing a vehicle wheel 1 according to this embodiment; in this figure, a sub air chamber member 10 serving as a Helmholtz resonator is attached to an outer circumferential surface 11d of a well portion 11c of a wheel through rails 20.

As seen in FIG. 1, the vehicle wheel 1 according to this embodiment is configured such that a sub air chamber member 10 (Helmholtz resonator) made of synthetic resin such as polypropylene and polyamide is attached to a rim 11 through the rails 20. The rim 11 is made of light metal such as aluminum alloy and magnesium alloy. According to this embodiment, the rim 11 may be a cast product, and the rails 20 may be an extruded product of the same light metal of which the rim 11 is made. The sub air chamber member 10 may be a blow-molded product.

Although not shown in FIG. 1, a disc by which a hub and the rim 11 are connected is disposed on the left side of the wheel (left side of the drawing sheet in the wheel width direction Y).

The rim 11 has a well portion 11c between bead seat portions 12, 12 that are formed on end portions of the rim 11 in the wheel width direction Y; the well portion 11c is recessed radially inward toward the center of the vehicle wheel 1. An outer circumferential surface 11d of the well portion 11c that is defined by the bottom surface of the recessed portion extends around the wheel axis and has substantially the same radius throughout the wheel width direction Y.

The rim 11 has a first vertical wall 15a and a second vertical wall 15b. These vertical walls 15a, 15b are spaced apart by a predetermined distance in the wheel width direction Y and rise outward from the outer circumferential surface 11d in the wheel radial direction Z.

According to this embodiment, each of the first vertical wall 15a and the second vertical wall 15b may be a rising portion that rises from the outer circumferential surface 11d of the well portion 11c toward the rim flange. In other words, the first vertical wall 15a and the second vertical wall 15b are spaced apart from each other by a predetermined distance and extend annularly in the wheel circumferential direction X, so that the vertical walls 15a, 15b are arranged opposite to each other.

Rails

As seen in FIG. 1, the rails 20 according to this embodiment consists of a pair of rail members 20a, 20b. The rail members 20a, 29b are disposed on both sides of the sub air chamber member 10 in the wheel width direction Y.

The rail member 20a is disposed inward of the first vertical wall 15a in the wheel width direction Y adjacent to the first vertical wall 15a. The rail member 20b is disposed inward of the second vertical wall 15b in the wheel width direction Y adjacent to the second vertical wall 15b.

Figure 2:
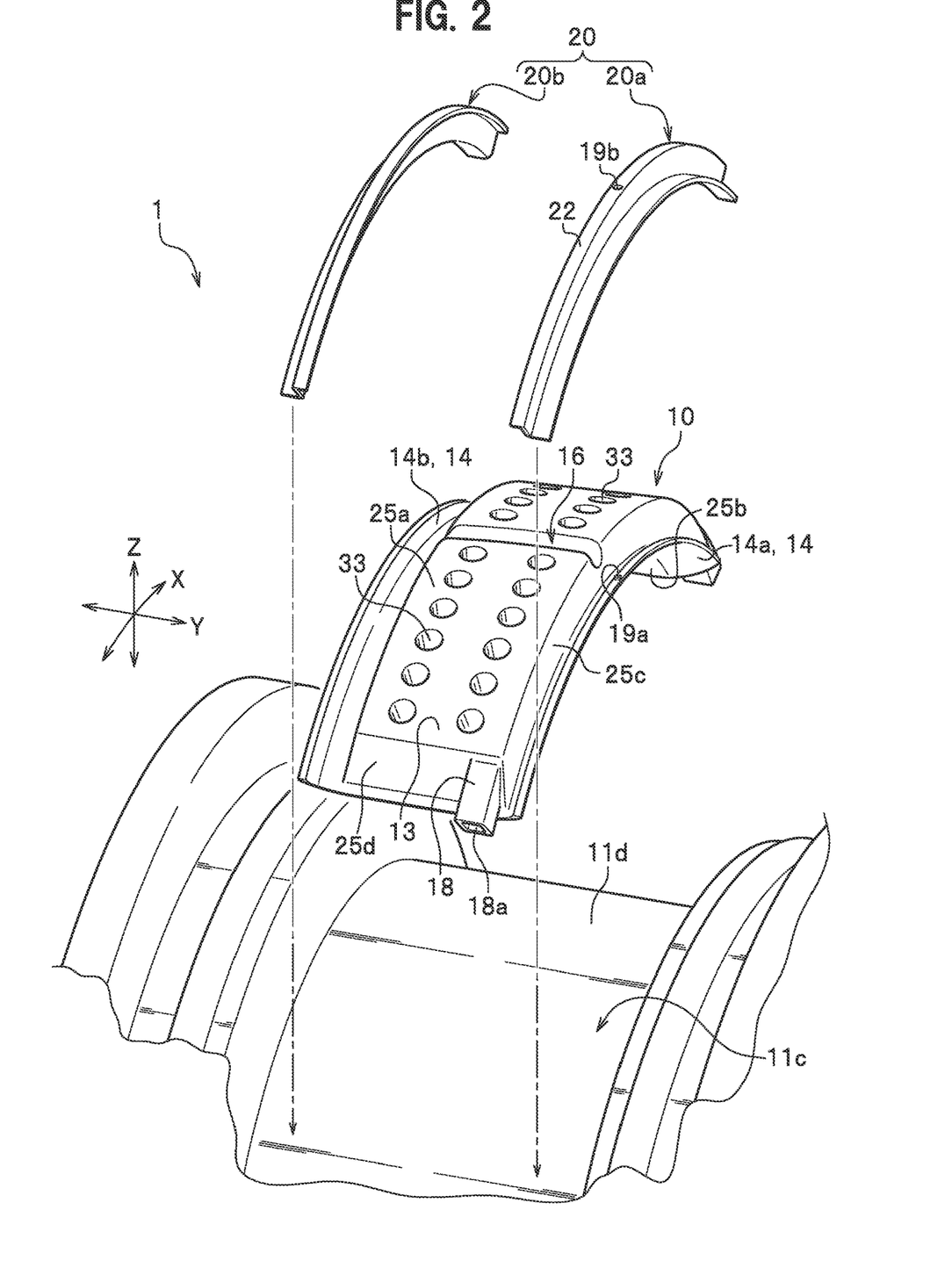
FIG. 2 is an exploded perspective view illustrating the vehicle wheel of FIG. 1.

FIG. 2 is an exploded perspective view illustrating the vehicle wheel 1 of FIG. 1; in this figure, the rails 20 and the sub air chamber member 10 are illustrated.

The rail members 20a, 20b constituting the rails 20 are circularly curved members extending in the wheel circumferential direction X.

In this embodiment, the length of the rail members 20a, 20b in the wheel circumferential direction X is substantially equal to the length of edge portions 14 (which will be described later) of the sub air chamber member 10 in the wheel circumferential direction X.

Figure 3:
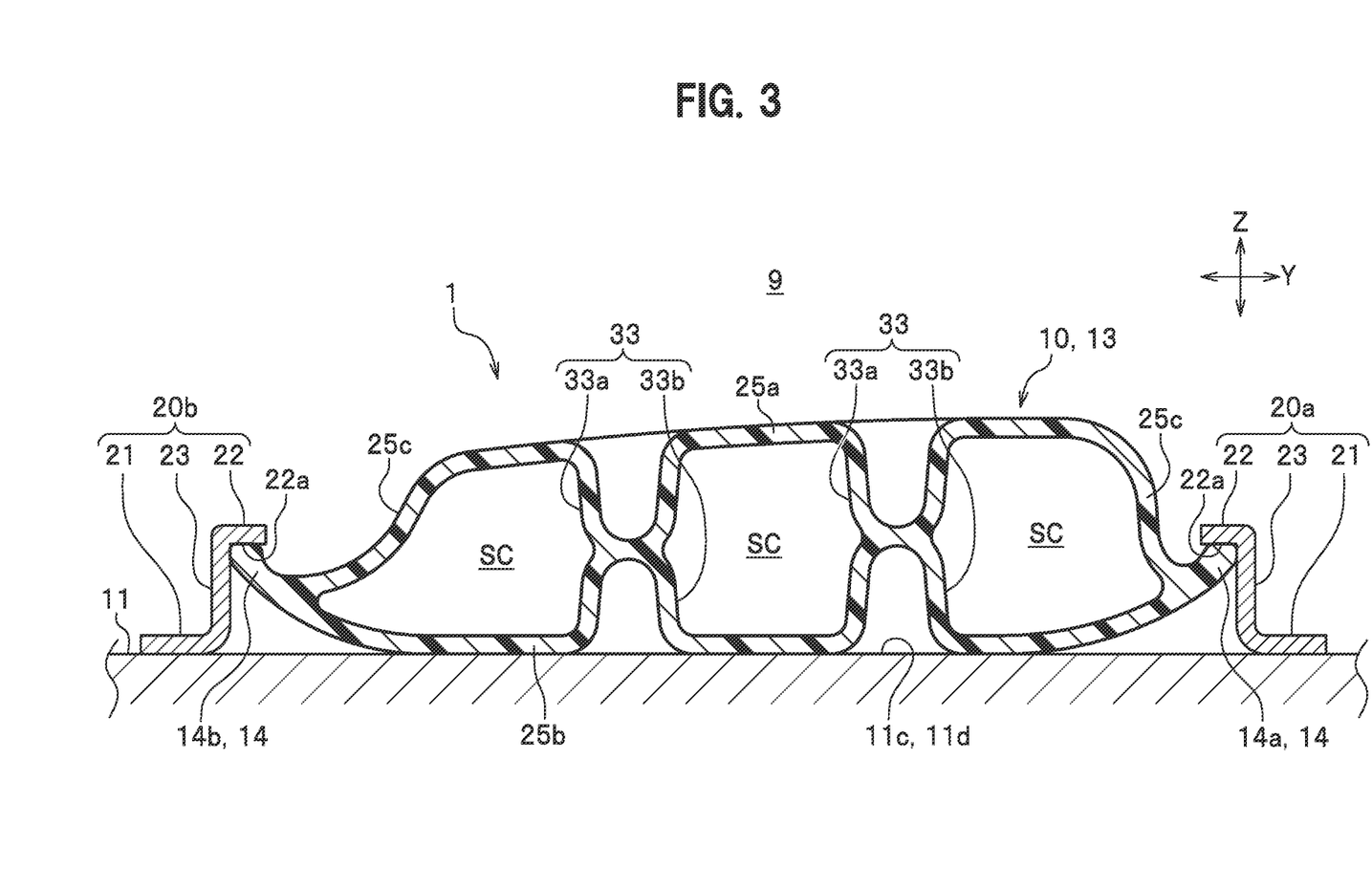
FIG. 3 is a sectional view of the vehicle wheel taken on the line of FIG. 1.

FIG. 3 is a sectional view of the vehicle wheel 1 taken on the line of FIG. 1.

As seen in FIG. 3, the rail members 20a, 20b according to this embodiment are symmetrical in shape about the sub air chamber member 10 disposed therebetween.

Each of the rail members 20a, 20b includes a base portion 21, a wall portion 23, and a support portion 22, which are formed of board members. The base portion 21, the wall portion 23, and the support portion 22 are formed in one-piece to provide a so-called Z-shaped sectioned member having a substantially Z-shaped cross-section.

The base portion 21 is disposed along the outer circumferential surface 11d of the well portion 11c.

The wall portion 23 is formed of a board member that rises in the wheel radial direction Z from an end edge of the base portion 21 closer to the sub air chamber member 10. The height of the wall portion 23 in the wheel radial direction Z is equal to the height of the outermost end of the edge portion 14 (which will be described later) in the wheel width direction Y when the sub air chamber member 10 is attached to the rim 11.

The support portion 22 is formed of an eaves-like board member extending out from an upper edge of the wall portion 23 toward the sub air chamber member 10. The edge portion 14 of the sub air chamber member 10 contacts an inner surface 22a of the support portion 22 that extends in a direction intersecting the wheel radial direction Z.

As seen in FIG. 2, an engagement hole 19b is formed in the support portion 22 of the rail member 20a; an engagement projection 19a is formed on the edge portion 14a of the sub air chamber member 10, and the engagement projection 19a is to be fitted into the engagement hole 19b. The engagement projection 19a and the engagement hole 19b constitute a "circumferential displacement restraint portion" defined in the claims.

As seen in FIG. 1, the rail members 20a, 20b configured as described above are fixed to the outer circumferential surface 11d of the well portion 11c by friction stir welding (FSW) only at both end portions thereof in the wheel circumferential direction X. In FIG. 1, welds J of the rail members 20a, 20b, by which the rail members 20a, 20b are fixed to the well portion 11c by friction stir welding, are shown as dotted areas; in FIG. 1 only the front welds J are illustrated in the drawing, and rear welds are omitted for the sake of convenience of illustration.

Sub Air Chamber Member

Next, with reference to FIG. 2, the sub air chamber member 10 will be described.

As seen in FIG. 2, the sub air chamber member 10 is a member extending long in one direction. The sub air chamber 10 includes a main body portion 13, a pair of tubular portions 18 each having a communicating hole 18a, and edge portions 14 through which the main body portion 13 is fixed to the rim 11.

The sub air chamber member 10 is configured to have a symmetrical shape in the wheel circumferential direction X about a partition wall 16 that extends in the wheel width direction Y and is disposed at a central portion of the main body portion 13.

The main body portion 13 curves in its longitudinal direction, so that when the sub air chamber member 10 is attached to the outer circumferential wall 11d of the well portion 11c, the main body portion 13 is disposed to extend in the wheel circumferential direction X.

The main body portion 13 has a hollow inner portion. This hollow portion (not shown in the drawings) forms a sub air chamber SC (see FIG. 3) to be described later. The hollow portion is divided into two halves in the wheel circumferential direction X by the partition wall 16. The partition wall 16 is formed by a top plate 25a and a bottom plate 25b (which will be described later in detail) that are recessed to form grooves extending in the wheel width direction Y. Further, although not shown in the drawings, the partition wall 16 is formed of the top plate 25a and the bottom plate 25b that are joined together at a generally central portion therebetween.

As seen in FIG. 3, the main body portion 13 of the sub air chamber member 10 has a flattened shape extending long in the wheel width direction Y as viewed in a section orthogonal to the longitudinal direction (i.e., wheel circumferential direction X in FIG. 1).

To be more specific, the main body portion 13 includes the top plate 25a, the bottom plate 25b, and side plates 25c.

The bottom plate 25b is formed of a board member extending in the outer circumferential surface 11d of the well portion 11c. In other words, the bottom plate 25b is substantially flattened in the wheel width direction Y and curves in the wheel circumferential direction X (see FIG. 1) with a curvature substantially the same as that of the outer circumferential surface 11d.

The top plate 25a curves with a predetermined radius of curvature in the wheel circumferential direction X (see FIG.

1) so that the top plate 25a and the bottom plate 25b are spaced apart by a predetermined distance and opposite to each other.

The sub air chamber SC is formed between the top plate 25a and the bottom plate 25b.

Each of the side plates 25c has a proximal end disposed at an end portion of the bottom plate 25b in the wheel width direction Y, and extends from the proximal end toward an end portion of the top plate 25a. The side plates 25c are connected to the end portions of the top plate 25a.

Further, as seen in FIG. 2, the main body portion 13 includes at end portions thereof in the wheel circumferential direction X side plates 25d configured to connect the top plate 25a and the bottom plate 25b.

In this embodiment, the sub air chamber member 10 is configured to have a symmetrical shape in the wheel circumferential direction X about the partition wall 16. Although not shown in the drawings for the sake of convenience of illustration, the side plates 25d according to this embodiment are provided in pair at both longitudinal end portions of the main body portion 13 (end portions in the wheel circumferential direction X); the side plates 25d are disposed at positions symmetrical to each other.

Further, as seen in FIG. 2, the main body portion 13 has a plurality of bridges 33 formed at regular intervals in the wheel circumferential direction X. The bridges 33 are arranged in two rows in the wheel width direction Y.

As seen in FIG. 3, the bridges 33 are formed by joining upper joint portions 33a and lower joint portions 33b at a generally central portion between the top plate 25a and the bottom plate 25b.

It should be noted that the upper joint portions 33a are formed of the top plate 25a partly recessed toward the bottom plate 25b. Similarly, the lower joint portions 33b are formed of the bottom plate 25b partly recessed toward the top plate 25a.

Each of the bridges 33 is generally circular cylindrical in shape and partly connects the top plate 25a and the bottom plate 25b. To be more specific, as viewed in a plan view, the upper joint portions 33a and the lower joint portions 33b are circular in shape, and the upper joint portions 33a and the lower joint portions 33b are superposed in the upper-lower direction to form generally circular cylindrical bridges 33.

Next, the tubular portions 18 will be described below.

As seen in FIGS. 1 and 2, the tubular portions 18 are formed on the main body portion 13 at positions offset toward one side of the main body portion 13 in the wheel width direction Y; the tubular portions 18 protrude from the main body portion 13 in the wheel circumferential direction X.

As described above, the sub air chamber member 10 according to this embodiment is configured to have a symmetrical shape in the wheel circumferential direction X about the partition wall 16. Therefore, according to this embodiment, a tubular portion 18 is provided on each longitudinal end portion of the main body portion 13 (i.e., end portion of the main body portion 13 in the wheel circumferential direction X); a pair of tubular portions 18 are disposed at positions symmetrical to each other. In this embodiment, the pair of tubular portions 18 are arranged at positions approximately 90 degrees apart from each other around a wheel rotation axis.

Further, as seen in FIG. 2, a communicating hole 18a is formed inside the tubular portion 18. The sub air chamber SC that is formed inside the main body portion 13 (see FIG. 3) and a tire air chamber 9 (see FIG. 3) that is formed between the well portion 11c (see FIG. 3) and a tire (not shown) are in communication with each other through the communicating hole 18a.

Next, edge portions 14 (see FIG. 3) will be described.

As seen in FIG. 3, the sub air chamber member 10 includes an edge portion 14a extending from the main body portion 13 toward the rail member 20a, and an edge portion 14b extending from the main body portion 13 toward the rail member 20b.

In this embodiment, the edge portion 14b is longer than the edge portion 14a.

The edge portions 14a, 14b are formed in one-piece with the bottom plate 25b; each of the edge portions 14a, 14b has a circularly curved surface extending in the outer circumferential surface 11d of the well portion 11c. These edge portions 14a, 14b provide spring elasticity by appropriately selecting the thickness and the material thereof.

As described above, ends of these edge portions 14a, 14b are brought into contact with the inner surfaces 22a (extending in a direction intersecting the wheel radial direction Z) of the support portions 22 of the rail members 20a, 20b.

Further, although not illustrated in FIG. 3, the edge portion 14a has the engagement projection 19a configured to be fitted into the engagement hole 19b of the rail member 20a (see FIG. 2).

Method of Manufacturing Wheel

The manufacturing method of the vehicle wheel 1 according to this embodiment will be described below.

The method of manufacturing the vehicle wheel 1 according to this embodiment includes: a rail member fixing step of fixing to the outer circumferential surface 11d of the well portion 11c (see FIG. 1) the pair of rail members 20a, 20b that are separate members from the rim 11 of the wheel such that the rail members 20a, 20b are disposed parallel to and spaced apart from each other by a predetermined distance; and a sub air chamber member attaching step of attaching the sub air chamber member 10 (see FIG. 1) to the well portion 11c through the pair of rail members 20a, 20b such that the sub air chamber member 10 is supported between the pair of rail members 20a, 20b.

Figure 4A:
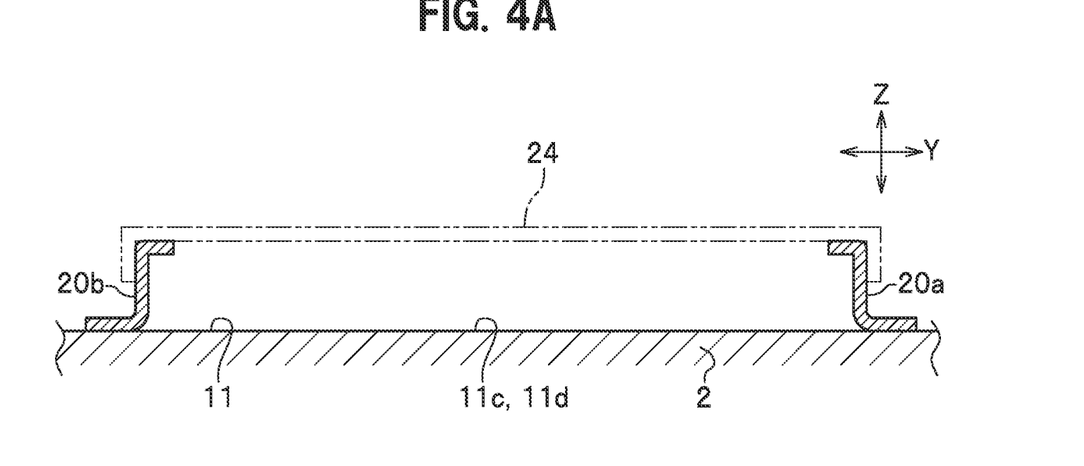
FIGS. 4A to 4C are views illustrating a manufacturing process of the vehicle wheel.
Figure 4B:
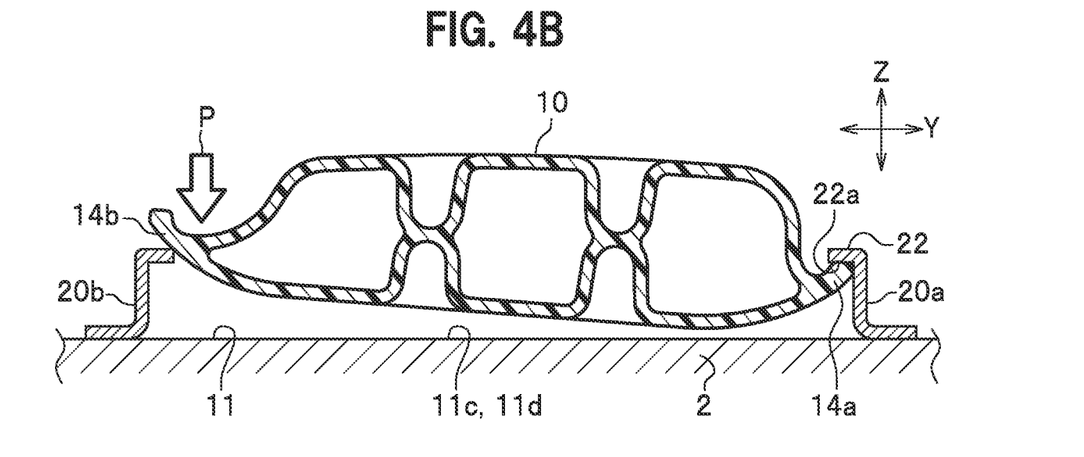
Figure 4C:
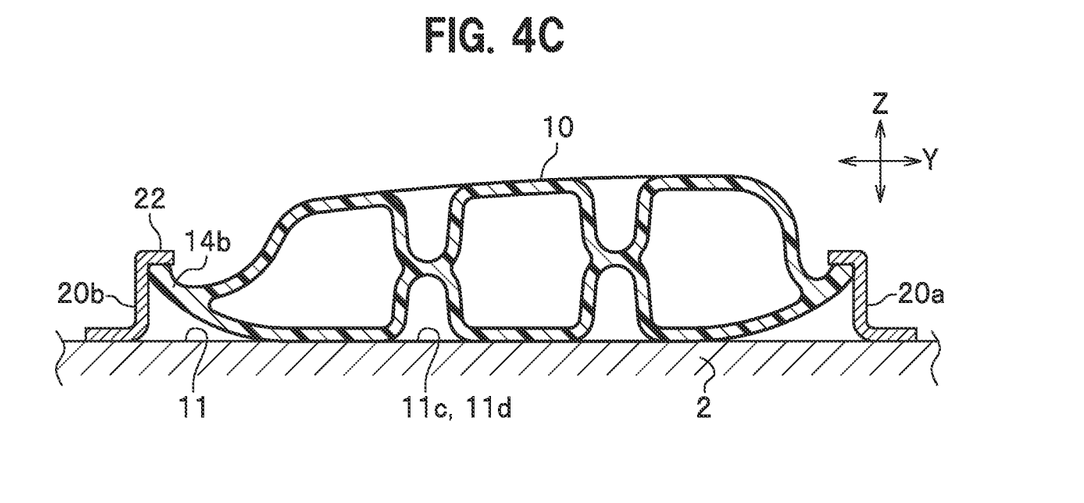

FIGS. 4A to 4C are views illustrating a manufacturing process of the vehicle wheel 1. According to this manufacturing method, as seen in FIG. 4A, a pair of rail members 20a, 20b are fixed to a wheel body 2 that has been prepared in advance (i.e., rail member fixing step).

The wheel body 2 is a cast product with a structure of the rim 11 as described above (see FIG. 1). However, the wheel body 2 may be a product available on the market with the structure of the rim 11.

The rail members 20a, 20b are placed on the outer circumferential surface 11d of the well portion 11c of the wheel body 2 with a predetermined distance spaced apart from each other, and thereafter the rail members 20a, 20b are fixed to the outer circumferential surface 11d.

To be more specific, the rail members 20a, 20b are retained by a jig 24 with a predetermined distance spaced apart from each other, and as described above, the end portions of the rail members 20a, 20b in the wheel circumferential direction X (see FIG. 1) are fixed to the outer circumferential surface 11d by friction stir welding.

The jig 24 as indicated by the phantom line (chain double-dashed line) in FIG. 4 A is removed from the rail members 20a, 20b after the rail members 20a, 20b are fixed to the outer circumferential surface 11d.

As long as the jig 24 can removably connect the rail members 20a, 20b spaced apart from each other by a predetermine distance, the shape of the jig 24 and means for connecting the rail members 20a, 20b are not limited to a particular configuration. The jig 24 according to this embodiment may be formed of a narrow and long board-like member to which the rail members 20a, 20b are to be fixed by screws.

In this manufacturing method, as seen in FIGS. 4B and 4C, the sub air chamber member 10 is fitted into a space between the rail members 20a, 20b, so that the sub air chamber member 10 is supported by the rail members 20a, 20b (i.e., sub air chamber member supporting step).

As seen in FIG. 4B, the sub air chamber member 10 is tilted such that the short edge portion 14a is located lower than the long edge portion 14b. Then, the short edge portion 14a is inserted into the space between the rail members 20a, 20 and disposed such that the end of the short edge portion 14a comes into contact with the inner surface 22a of the support portion 22 of the rail member 20a.

At this position, the engagement projection 19a (see FIG. 2) of the edge portion 14a is fitted into the engagement hole 19b (see FIG. 2) of the rail member 20a.

Next, when the long edge portion 14b is pressed down toward the outer circumferential surface 11d by an external force applied by a pusher (not shown) and the like as shown by the open arrow P in FIG. 4B, the edge portion 14b riding on the rail member 20b elastically deforms due to the external force and the reaction force from the rail member 20b.

Further, as seen in FIG. 4C, when the end of the edge portion 14b is lowered below the support portion 22 of the rail member 20b and the external force of the pusher is removed, the edge portion 14b having been elastically deformed recovers its original shape, so that the end of the edge portion 14b comes into engagement with the support portion 22 of the rail member 20b.

Accordingly, the sub air chamber member 10 is fixed to the outer circumferential surface 11d of the well portion 11c through the rail members 20a, 20b, so that even if a large centrifugal force acts on the sub air chamber member 10, the sub air chamber member 10 is restrained from coming off the rim 11.

Further, since the engagement projection 19a (see FIG. 2) is fitted into the engagement hole 19b (see FIG. 2) of the rail member 20a, a displacement of the sub air chamber member 10 in the wheel circumferential direction X (see FIG. 1) can be restrained.

Operation and Effects

Operation and effects of the vehicle wheel 1 according to this embodiment will be described below.

According to the vehicle wheel 1, a pair of rail members 20a, 20b configured as separate members from the rim are fixed to the outer circumferential surface 11d of the well portion 11c of the rim 11, and the sub air chamber member 10 is fixed to the rim through the pair of rail members 20a, 20b.

According to this vehicle wheel 1, unlike the conventional vehicle wheel (for example, disclosed in Japanese Patent No. 5,657,309), it is not necessary to cut the well-portion rising walls to provide groove portions for fixing a Helmholtz resonator. Accordingly, the vehicle wheel 1 can reduce the manufacturing cost while stably holding the sub air chamber member 10 relative to the rim 11.

Further, according to this vehicle wheel 1, the engagement projection 19a formed on the edge portion 14a of the sub air chamber member 10 is fitted into the engagement hole 19b formed in the rail member 20a. Providing the engagement projection 19a and the engagement hole 19b (i.e., circumferential displacement restraint portion) can restrain a displacement of the sub air chamber member 10 in the wheel circumferential direction X during the rotation of the wheel. With this configuration of the vehicle wheel 1, the sub air chamber member 10 can be stably held relative to the outer circumferential surface 11d of the well portion 11c. Accordingly, the vehicle wheel 1 can enhance more reliably the holdability of the sub air chamber member 10 relative to the outer circumferential surface 11d of the well portion 11c.

It should be noted that the circumferential displacement restraint portion according to this embodiment is constituted by the rails 20 and the sub air chamber member 10. However, the circumferential displacement restraint portion may be constituted by either one of the rails 20 and the sub air chamber member 10.

For example, the circumferential displacement restraint portion may be constituted by a rib (not shown) extending from the end face of each of the rail member 20a, 20b in the wheel circumferential direction X toward the end face of the sub air chamber member 10 in the wheel circumferential direction X. As an alternative, the circumferential displacement restraint portion may be constituted by a pair of ribs (not shown) extending from the end face of the sub air chamber member 10 in the wheel circumferential direction X toward the end faces of the rail members 20a, 20b in the wheel circumferential direction X.

Further, the rails 20 are friction stir welded to the outer circumferential surface 11d of the well portion 11c.

According to this vehicle wheel 1, even if the rim 11 and the rails 20 are made of a material such as aluminum alloy and they are difficult to be welded together, it is possible to join the rim 11 and the rails 20 firmly by simple process.

According to the manufacturing method of the vehicle wheel 1, the rail members 20a, 20b are spaced apart by a predetermined distance and fixed using the jig 24 in the rail member fixing step.

According to this manufacturing method, it is possible to further improve the degree of positioning accuracy when the rail members 20a, 20b are fixed to the outer circumferential surface 11d with a predetermined distance spaced apart from each other based on the design of the rail members 20a, 20b.

In particular, great advantageous effects can be obtained by the jig 24 in the manufacturing method according to this embodiment, because a force of the tool is applied to the rail members 20a, 20b during the friction stir welding.

Although one preferred embodiment of the present invention has been described above, the present invention is not limited to the above-described embodiment, and various changes and/or modifications may be made without departing from the scope of the claims.

The jig 24 used in the above embodiment (see FIG. 4A) is removed from the rail members 20a, 20b after the rail members 20a, 20b are fixed to the outer circumferential surface 11d of the well portion 11c.

However, the vehicle wheel 1 may include an unremovable restraint portion for adjusting the distance between the rail members 20a, 20b.

Figure 5A:
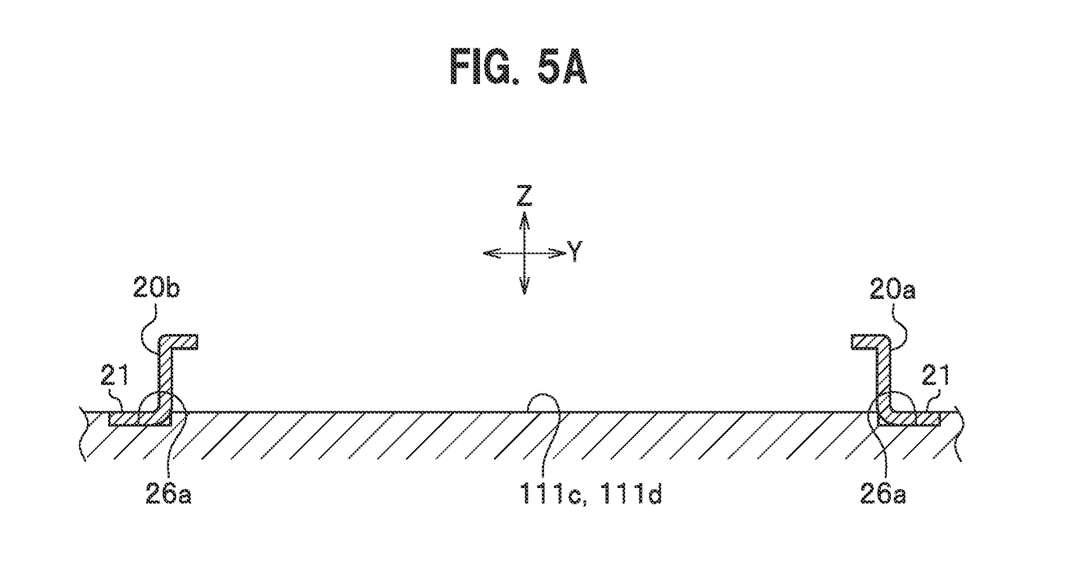
FIGS. 5A and 5B are explanatory views illustrating the structure of a restraint portion for adjusting a distance between a pair of rail members.
Figure 5B:
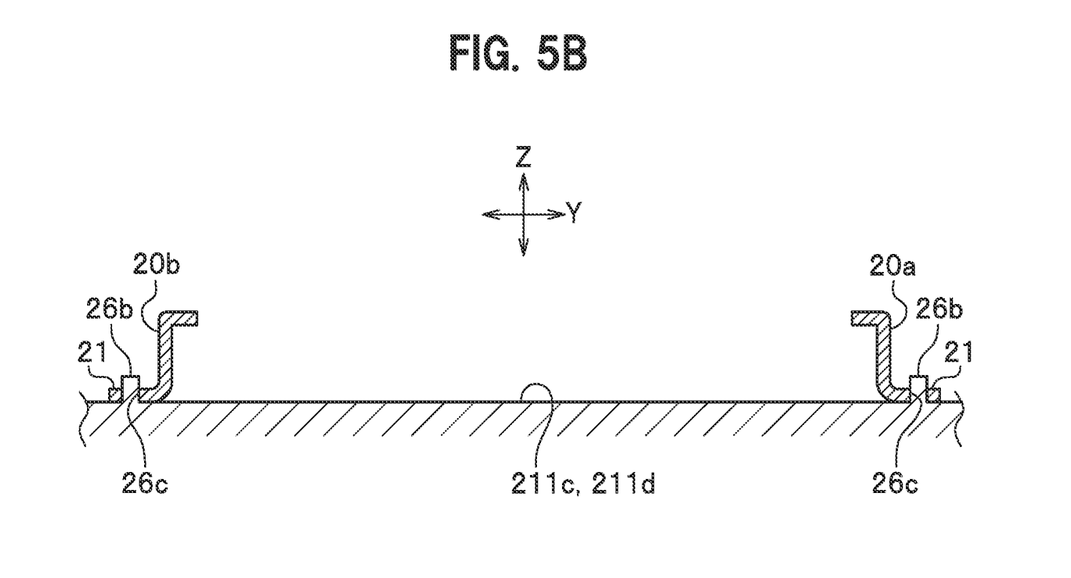

FIG. 5A is an explanatory view illustrating the structure of the restraint portion according to the first embodiment for adjusting the distance between the pair of rail members 20a, 20b, and FIG. 5B is an explanatory view illustrating the structure of the restraint portion according to the second embodiment for adjusting the distance between the pair of rail members 20a, 20b.

As seen in FIG. 5A, the restraint portion according to the first embodiment includes grooves 26a (recess portions) formed in the outer circumferential surface 111d of the well portion 111c, into which base portions 21 of the rail members 20a, 20b are respectively fitted.

Further, as seen in FIG. 5B, the restraint portion according to the second embodiment includes studs 26b protruding upward from the outer circumferential surface 211d of the well portion 211c toward the rail members 20a, 20b, and insertion holes 26c formed in the base portions 21 of the rail members 20a, 20b and into which the studs 26b are inserted.

With this configuration of the restraint portion, the operation and effects that are the same as those of the above-described jig 24 (see FIG. 4A) are provided. Further, since it is not necessary that the jig 24 be attached to and detached from the rail members 20a, 20b, the manufacturing process for the vehicle wheel 1 can be simplified.

In this vehicle wheel 1, the restraint portion may be a connecting portion configured to connect the rail members 20a, 20b.

Figure 6A:
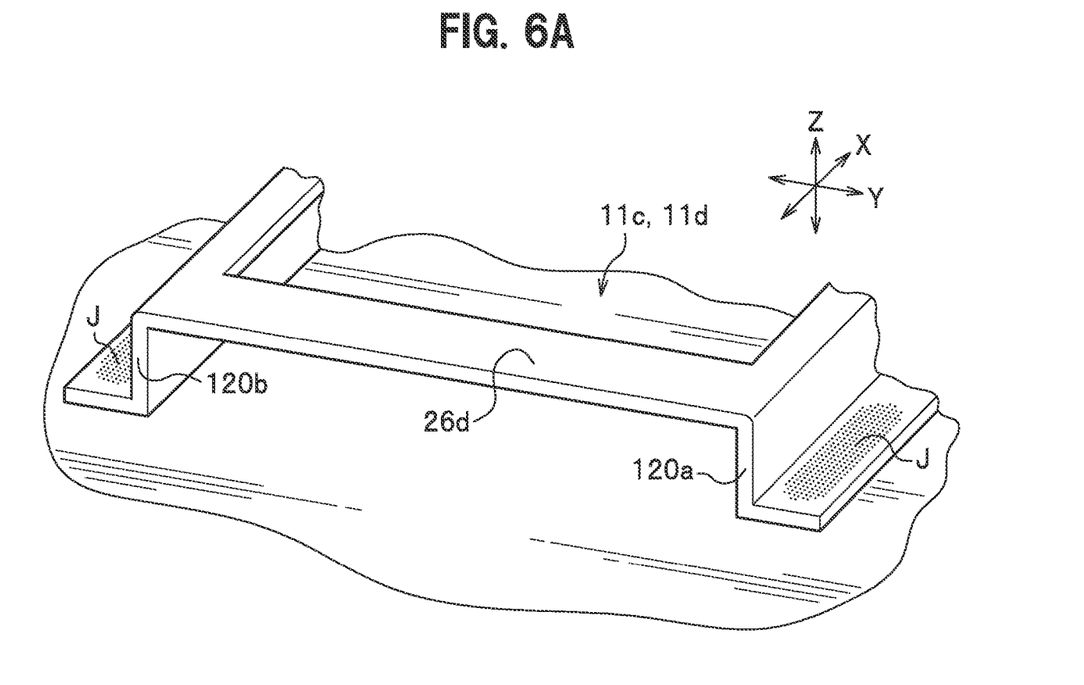
FIGS. 6A and 6B are explanatory views illustrating the structure of a connecting portion (restraint portion) for connecting the pair of rail members.
Figure 6B:
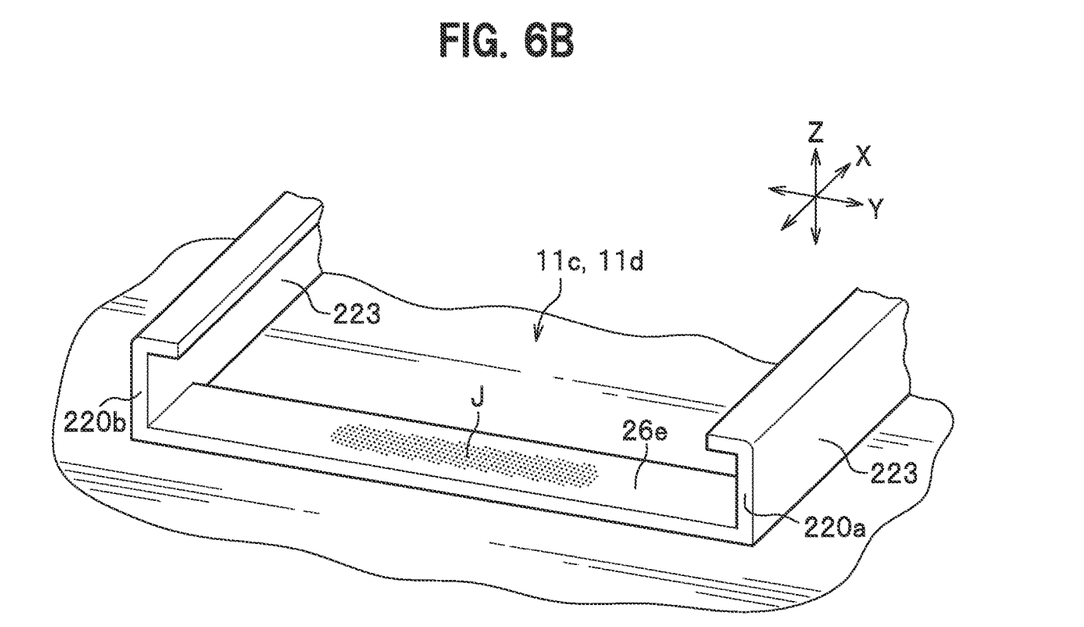

FIG. 6A is an explanatory view illustrating the structure of the connecting portion according to the first embodiment for connecting the rail members 120a, 120b. FIG. 6B is an explanatory view illustrating the structure of the connecting portion according to the second embodiment for connecting the rail members 220a, 220b.

As seen in FIG. 6A, the connecting portion 26d according to the first embodiment is formed of a board member configured to connect the support portions integrally at end portions of the rail members 120a, 120b in the wheel circumferential direction X.

According to the vehicle wheel 1 equipped with the connecting portion 26d as a restraint portion, the operation and effects same as those of the above-described jig 24 are provided. Further, since it is not necessary that the jig 24 be attached to and detached from the rail members 120a, 120b, the manufacturing process for the vehicle wheel 1 can be simplified.

The connecting portion 26d may also be used as a circumferential displacement restraint portion.

As seen in FIG. 6B, the connecting portion 26e according to the second embodiment is formed of a board member configured to connect lower edges of the wall portions 223 integrally at end portions of the rail members 220a, 220b in the wheel circumferential direction X.

The connecting portion 26e is fixed to the outer circumferential surface 11d of the well portion 11c by friction stir welding.

The reference characters "J" in FIGS. 6A and 6B indicate welds by friction stir welding.

According to the vehicle wheel 1 equipped with the connecting portion 26e as a restraint portion, the operation and effects same as those of the above-described jig 24 are provided. Further, since it is not necessary that the jig 24 be attached to and detached from the rail members 220a, 220b, the manufacturing process for the vehicle wheel 1 can be simplified.

Further, providing the connection portion 26e makes it possible to eliminate the base portions of the rail members 220a, 220b.

The method of manufacturing the vehicle wheel 1 according to the above-described embodiment has been described with reference to FIGS. 4A to 4C; in this method, the sub air chamber member 10 is pressed down from above the rail members 20a, 20b so that the sub air chamber member 10 is fitted between the rail members 20a, 20b. However, the sub air chamber member 10 may be attached to the rail members 20a, 20b by inserting the sub air chamber member 10 from one side of the rail members 20a, 20b and sliding the sub air chamber member 10 in the wheel circumferential direction X.

The invention claimed is:

1. A vehicle wheel comprising:
a pair of rail members fixed to an outer circumferential surface of a well portion of a rim of a wheel, the pair of rail members being curved members extending in a wheel circumferential direction and formed as separate members from the rim;
a sub air chamber member serving as a Helmholtz resonator, the sub air chamber member being disposed between the rail members and supported by the rail members; and
a restraint portion configured to adjust a distance between the rail members, wherein
each of the rail members has a generally Z-shaped cross-section,
the restraint portion comprises grooves formed on the outer circumferential surface of the well portion and engageable with the rail members,
the sub air chamber member comprises a main body portion, and a pair of edge portions extending in a wheel width direction from the main body portion toward the rail members, the pair of edge portions being elastically deformable to engage the rail members, and
one edge portion disposed outward of the main body portion in the wheel width direction and the other edge portion disposed inward of the main body portion in the wheel width direction are different in length in the wheel width direction.

2. The vehicle wheel according to claim 1, further comprising a circumferential displacement restraint portion configured to restrain the sub air chamber member from being displaced in the wheel circumferential direction relative to the rail members.

3. The vehicle wheel according to claim 1, wherein the rail members are friction stir welded to the outer circumferential wall of the well portion of the rim.

4. A method of manufacturing a vehicle wheel according to claim 1, the method comprising:
a rail member fixing step of fixing to the outer circumferential surface of the well portion the pair of rail members that are separate members from the rim of the wheel such that the rail members are disposed parallel to and spaced apart from each other by a predetermined distance; and
a sub air chamber member attaching step of attaching the sub air chamber member to the well portion through the pair of rail members such that the sub air chamber member is supported between the pair of rail members,
wherein the rail member fixing step comprises a step of fixing the pair of rail members using a jig with the rail members spaced apart by the predetermined distance.

* * * * *